April 5, 1949.  J. G. JONES  2,466,436
MOTION-PICTURE FILM PERFORATOR
Filed Feb. 5, 1947  5 Sheets-Sheet 1
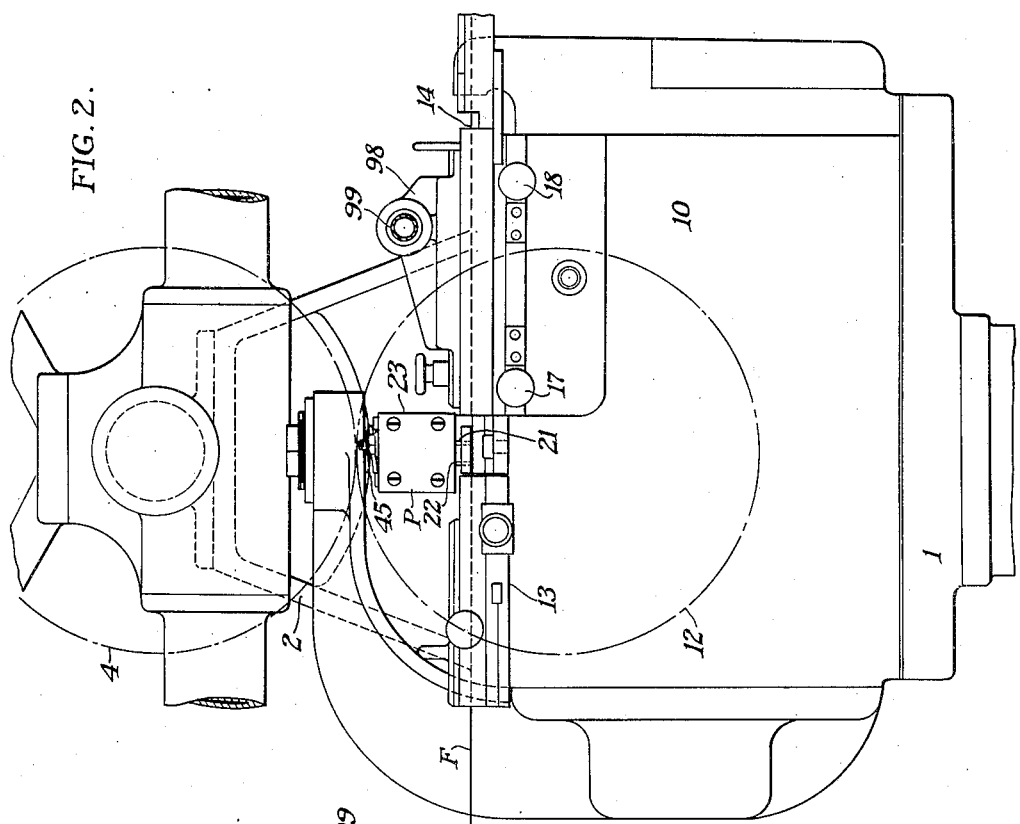
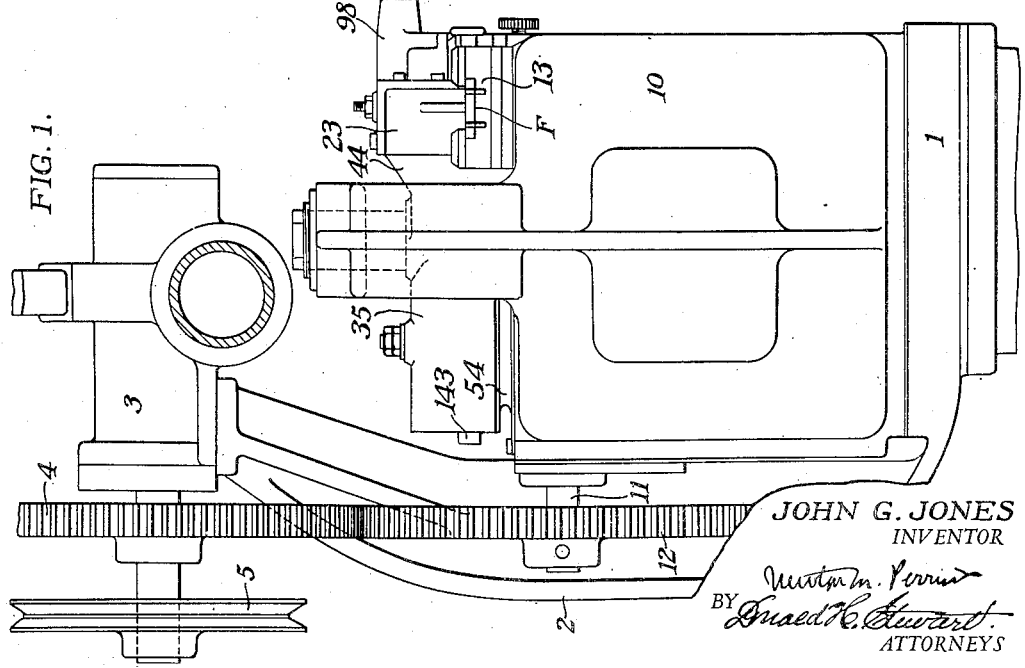
JOHN G. JONES
INVENTOR
BY
ATTORNEYS April 5, 1949.  J. G. JONES  2,466,436
MOTION-PICTURE FILM PERFORATOR
Filed Feb. 5, 1947  5 Sheets-Sheet 2
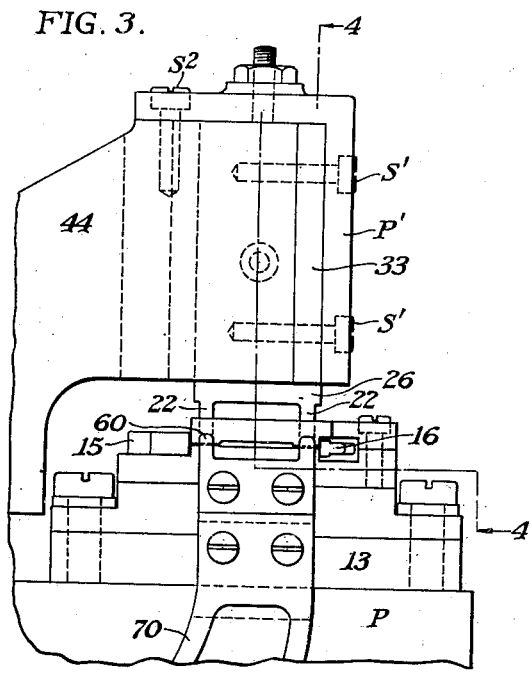
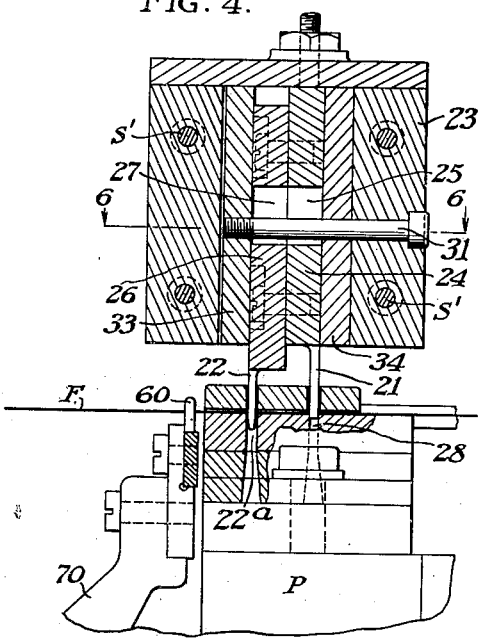
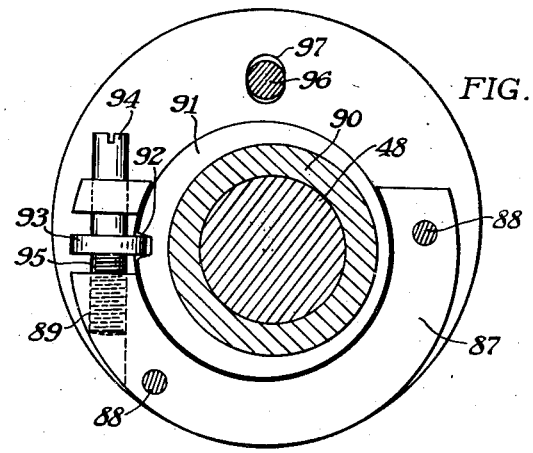
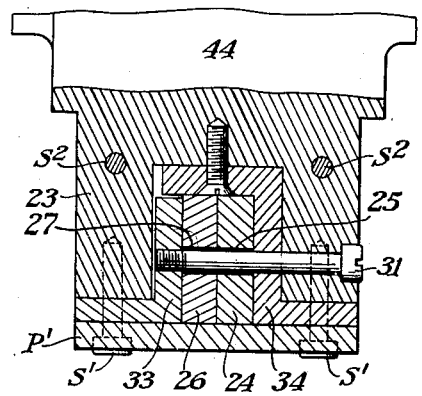
JOHN G. JONES
INVENTOR
BY
ATTORNEYS

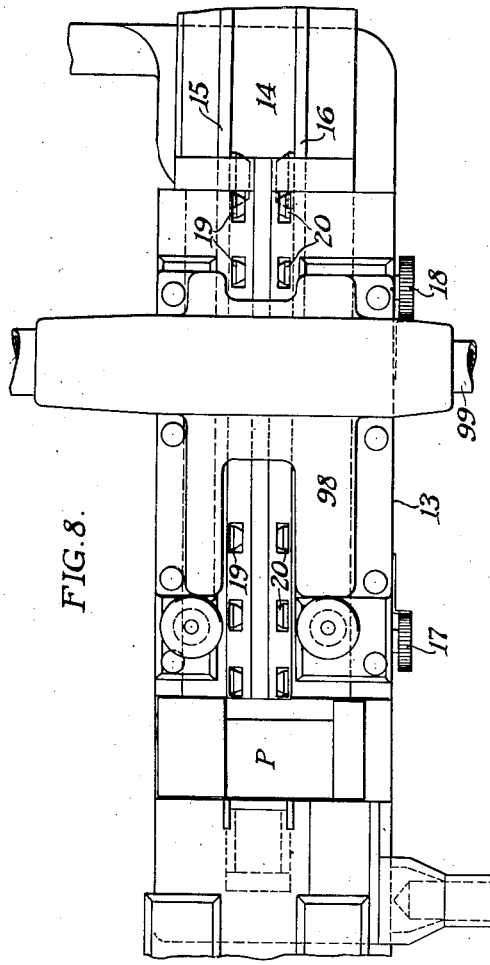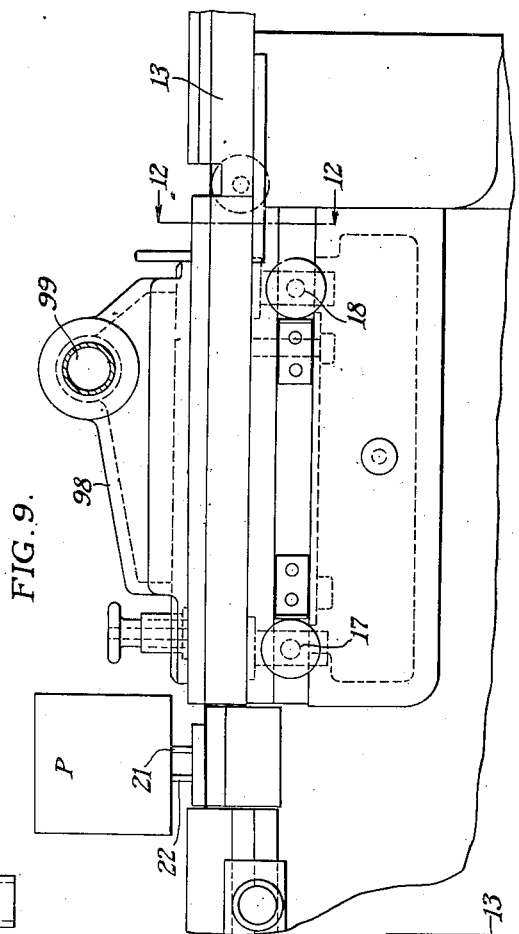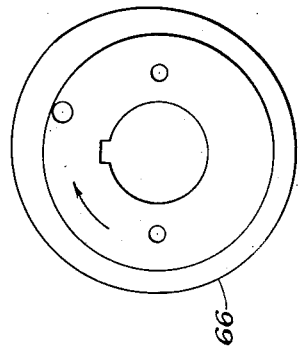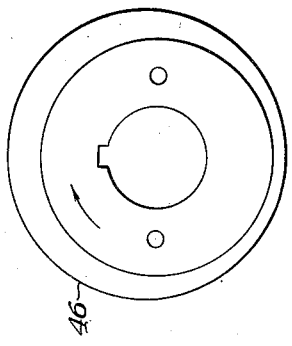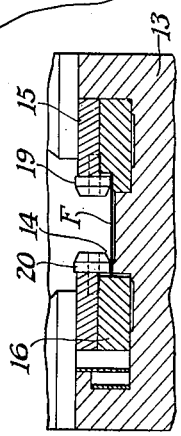

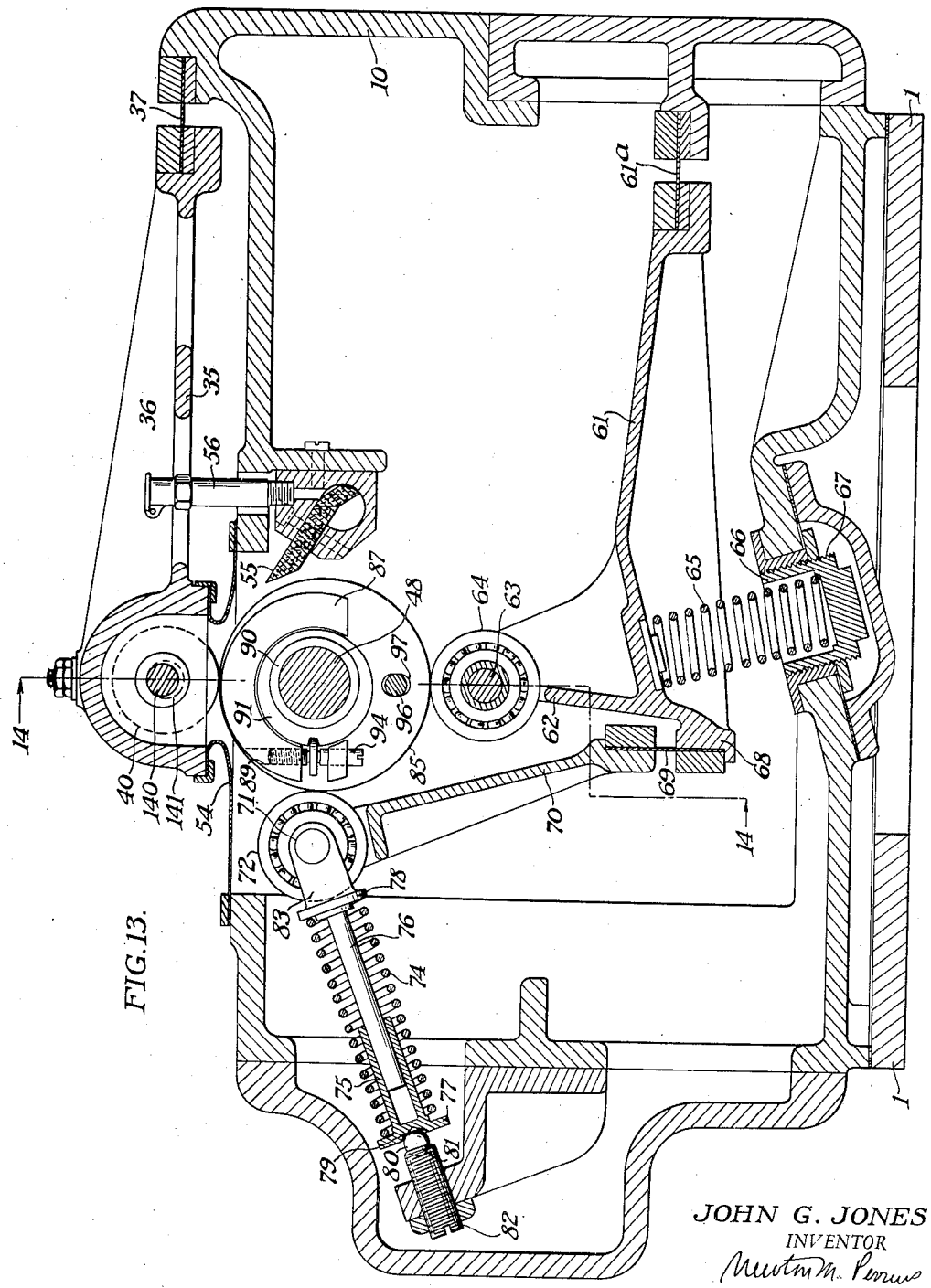

April 5, 1949.	J. G. JONES	2,466,436
MOTION-PICTURE FILM PERFORATOR
Filed Feb. 5, 1947	5 Sheets-Sheet 5

JOHN G. JONES
INVENTOR
BY
ATTORNEYS

Patented Apr. 5, 1949

2,466,436

UNITED STATES PATENT OFFICE 2,466,436

MOTION-PICTURE FILM PERFORATOR

John G. Jones, Rochester, N. Y., assignor to Eastman Kodak Company, Rochester, N. Y., a corporation of New Jersey Application February 5, 1947, Serial No. 726,705

17 Claims. (Cl. 164—88)

This invention relates to apparatus for perforating motion picture film. One object of my invention is to provide a machine by which highly-accurate perforations can be made in film. Another object is to provide a perforator which can be operated at high speed. Another object is to provide a perforator which can be accurately adjusted and in which the relationship of the parts may be properly positioned and retained in position for use. Still another object is to provide a perforating mechanism movable as a unit to and from a support and power drive for repair or adjustment. Other objects will appear from the following specification, the novel features being particularly pointed out in the claims at the end thereof.

It is necessary to intermittently move motion picture film with a high degree of accuracy to produce good results. The Society of Motion Picture Engineers' standard of .300" plus or minus not over .0005" (one-half of one thousandth of an inch) was set as a desirable goal for perforating 16-mm. film. This .0005" tolerance may produce pictures with a perceptible "jump," because in a 120X enlargement of a 16-mm. film (producing a picture three feet high), this jump may be about $\frac{1}{16}$" on the screen. A very accurate camera and projector are, of course, required for best results. But, unless the film also is accurate, the results will not be tolerable regardless of the camera and projector. I am able to fully meet and even exceed the S. M. P. E. standards with my improved form of film perforator which will now be described.

Coming now to the drawings wherein like reference characters denote like parts throughout:

Fig. 1 is an end elevation of a preferred film punching unit constructed in accordance with and embodying a preferred form of my invention, certain parts being omitted for clearness;

Fig. 2 is a front elevation of the machine shown in Fig. 1;

Fig. 3 is a fragmentary end elevation on a somewhat enlarged scale showing a part of the film punching mechanism;

Fig. 4 is a fragmentary front elevation partially in section on line 4—4 of Fig. 3 of the film punch and pilot assembly shown in Fig. 3;

Fig. 5 is a fragmentary detail section showing a portion of a cam adjusting mechanism;

Fig. 6 is a section through the punch and pilot assembly taken on line 6—6 of Fig. 4;

Fig. 7 is a fragmentary part section and part elevation of the adjustment mechanism shown in Fig. 5;

Fig. 8 is a fragmentary top plan view showing parts of the film bed or film guideway to direct film to and from the punch;

Fig. 9 is a front elevation of the structure shown in Fig. 8;

Fig. 10 is a side elevation of the vertical shuttle cam;

Fig. 11 is a side elevation of the head cam;

Fig. 12 is a somewhat enlarged section taken on the line 12—12 of Fig. 9;

Fig. 13 is an enlarged transverse section through the shuttle mechanism box and mechanism showing in section the punch arm;

Fig. 17 is a fragmentary perspective view of the pilot tooth.

Figure 14:
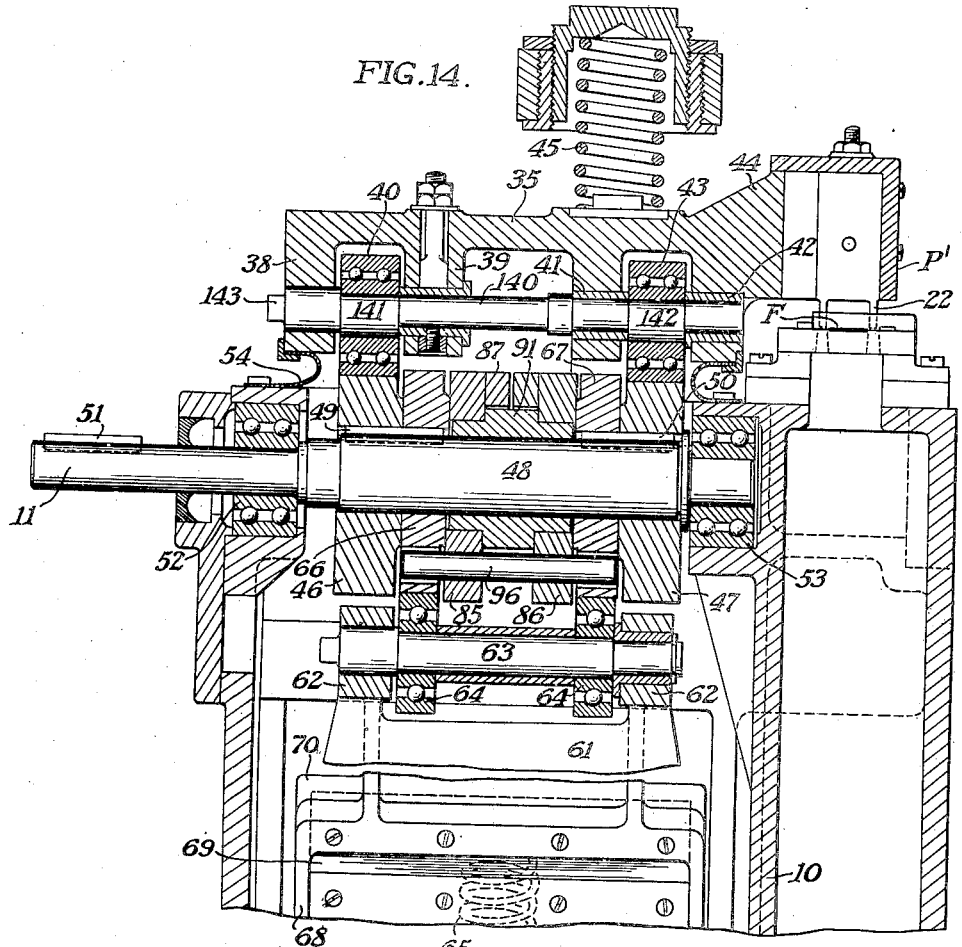
Fig. 14 is an enlarged section taken on line 14—14 of Fig. 13.

My improved punch is especially designed for 16-mm. film (as this is the most difficult to perforate accurately) although the construction is also well suited to any other size film, such as 35-mm., 70-mm., 8-mm., or the like.

My invention broadly resides in a machine in which all wearing and moving parts are accurately made, and pivotal and hinged connections are materially improved. My improved machine has a film-moving shuttle and a film punch, both operable at high speeds and constructed without the usual pivots, hinge pintles, and slides to eliminate, as far as possible, all unwanted play between the relatively moving parts. Thus, the play which is found even in the best-constructed slides, pivots, and hinges, is at least substantially eliminated and a high degree of precision may be obtained. For instance, in 16-mm. film, the spacing between perforations may be the S. M. P. E. standard of .300" plus or minus not over .0005", as previously mentioned. Greater accuracy, down to .00004" (four one-hundred-thousandths of an inch) is not only possible but has been obtained with my machine operating at a speed of 1800 to 2000 strokes per minute. A normal speed of perforating 35-mm. film is from 550 to 710 strokes per minute.

In the illustrated embodiment of my invention, I have constructed the perforator to slide onto and be actuated by a standard type of perforator table and drive. The table 1 may have a supporting frame 2 carrying a bearing 3 for a drive gear 4 which may be suitably driven from a source of power connected to the pulley 5. This is merely a convenience so that the punch drive housing 10 with drive shaft 11 and gear 12 meshing with drive gear 4 can be moved to and from the table 1 for punch sharpening or repair. Gears 4 and 12 may be made with spiral teeth, if desired. Thus, the entire punching mechanism can be removed from the table 1, leaving only the frame 2, bearing 3, and gear 4 without disconnecting any other operable parts but gear 12 from gear 4.

The housing 10 contains a film guide on the top 13 best shown in Figs. 8, 9 and 12. Film moves from right to left in these figures and, as shown also in Fig. 12, the film F passes through a guideway 14 comprising a fixed guiding rail 15 and a spring-pressed rail 16; these two rails being recessed in the top 13. For initially setting up the machine, the entire film guideway including both rails 15 and 16 can be adjusted by adjusting screws 17 and 18.

The film F is guided by the rails 15 and 16 and rollers 19 and 20, as shown in Fig. 12, to direct film through a path in which it is perforated. Rollers 19 and 20 are carried by the rails 15 and 16. The punching or perforating station is designated broadly at "P."

The perforator 21 (Fig. 4) and pilot 22 are carried by a head 23 built up from accurately ground and polished metal pieces. The pilot 22 may have a sliding fit in a pilot aperture 22ᵃ. Referring to Figs. 4 and 6, piece 24, perforated at 25, carries the punch 21 and a similar piece 26 perforated at 27 carries the pilot 22. The punch 21 is made of exact size and has no clearance in the die 28. The punch 21 is used as a sizing broach in making the die 28, forcing it through the die before the final hardening of the die. Consequently, in operation, it is preferable to have the punch enter the die 28 a minimum distance. In fact, perforating can be done with the plane of the bottom of the punch 21 stopping its downward movement when parallel to the plane of the top of the die 28 without the punch entering the die at all.

Figure 15:
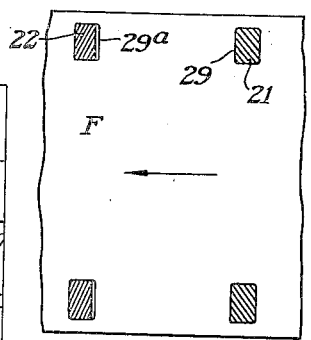
Fig. 15 is an enlarged fragmentary view of a film showing the pilot and punch in horizontal section in the positions they assume in punching.

Referring to Fig. 15, it will be noted the punch 21 exactly fills the perforated hole 29 in the film F. The pilot 22, however, does not fill the perforation 29ᵃ, being the same width but of less length, as shown in Fig. 15. Another difference of the pilot 22 is that it has a tapered end, as shown in Fig. 17; the beveled edge 30 engaging and moving the film the final .0005" as the pilot enters a distance D through the film perforation 29ᵃ. The shuttle which moves the film and which will be hereinafter described is designed to move the film .0005" short of the distance .300" between perforations.

It will be noticed that by lapping the facing surfaces of piece 24 carrying the punch 21 and piece 26 carrying the pilot that the total spacing between centers of the punch and pilot, .300", can be obtained with exceedingly great accuracy before these parts are fastened together by screws 31 and assembled between the L-shaped part 32 and the Z-shaped part 34 (Fig. 6) and fastened in the head 23 by screws S', face plate P', and screws S². All facing surfaces are carefully ground to fit and accurately squared.

The assembled punch 21 and pilot 22 are carried by an arm 35 (Fig. 13). This arm is preferably made of a light metal, such as magnesium, and for rigidity is provided with suitable webs 36. Since arm 35 must be rapidly oscillated without any play or lost motion, I provide a relatively narrow, wide reed 37 fastened to the arm 35 at one end and to the punch housing 10. Such a reed is preferably made of springy material, preferably beryllium copper. The arm is quite wide, carrying bushed shaft lugs 38 and 39 between which is a ball-bearing roller 40, and bushed lugs 41 and 42 for ball-bearing roller 43, as indicated in Fig. 14. As also here indicated, the punch 21 and pilot 22 are carried on the arm extension 44.

A shaft 140 carrying the ball-bearing rollers 40 and 43 has eccentric sections 141 and 142 only in the areas carrying the rollers, so that when the shaft is turned by the polygonal end 143, the punches can be adjusted relatively to the dies to partially or completely penetrate the die 28 or penetrate none at all, either a little or a considerable distance into the die. I prefer normally to have the punch barely enter the die.

Arm 35 is pressed down by spring 45 firmly contacting ball-bearing rollers 40 and 43 against cams 46 and 47 carried by cam shaft 48. These cams are ground together and keyed, by keys 49 and 50, to shaft 48. The tolerances on the cams are preferably kept within less than .001" at any point, the curves being worked out for distances one and one-half degrees apart. Cam shaft 48 is preferably an extension of drive shaft 11 driven by gear 12 meshing with the main drive gear 4, which is mounted on the shaft to turn with it through key 51. The cam shaft is supported on ball bearings 52 and 53. I also provide a boot 54 of rubber, Koroseal or other oilproof flexible material to keep oil away from the film F being punched. Oil may be applied to a wick 55 (Fig. 13) through oil cup 56 passing into housing 10. This wipes oil on the cams at each revolution. Spring 45 is strong enough to always hold rollers 40 and 43 against cams 46 and 47. Two cams are used so that with the spaced cams and wide reed 37 (this being, in the present instance, longer than the space between rollers 40 and 43) there is no tendency to twist, and lost motion is reduced to a minimum, if not entirely removed.

The punch 21 and pilot 22, of course, move through an arc equal to the length of arm 35 to the punch and pilot but this arc is so slight that it is immaterial. The arm from the reed 37 to the punch 21 may be in the order of 6" whereas the travel of arm 35 riding on cams 46 and 47 is only .110" at the point of perforation.

All the dimensions given herein are by way of illustration only for a 16-mm. film perforator. They may be varied widely and, of course, changed for 35-mm. or other types of film punches.

As indicated in Fig. 4, there is a shuttle for moving the film strip intermittently through the machine, consisting of parallel pins 60 engageable with the perforations 29 in film F. These shuttle pins 60 have a path moving upwardly into the aperture 29, moving the film toward the left, and moving down and back to its starting place after leaving an aperture 29. The pins 60 are carried and moved in the following manner. The up-and-down movement is obtained by lever 61 (Fig. 13) connected by reed 61ᵃ to the housing 10. This lever 61 has a pair of spaced bearings 62 for a shaft 63 carrying ball-bearing rollers 64. A spring 65 presses these rollers into contact with cams 66 and 67 also keyed to shaft 48 by keys 49 and 50. Pressure on springs 65 may be adjusted on the adjustable sleeve 66 threaded at 67 to casing 10.

Lever 61 also has a flange 68 carrying reed 69 to which is also attached a second lever 70. Lever 70 carries a shaft 71 supporting spaced ball-bearing rollers 72 and 73 and a spring 74 carried by a telescoping spool made of telescoping hubs 75 and 76 having flanges 77 and 78. Flange 77 has a recess 79 for a ball support 80, the ball resting in the recess 81 of adjustable screw 82, and flange 78 carries a yoke 83 supporting shaft 71. Rollers 72 and 73 are therefore pressed by spring 74 against cams 85 and 86 which control the length of the shuttle-feeding stroke. This must be controlled with extreme accuracy to the distance .300" less the distance .0005" that the film is moved by the pilot 22, so that this last slight film movement is accomplished by the pilot 22 just before punch 21 functions to make a succeeding pair of perforations. The up-and-down travel is not so critical, but obviously must be interrelated to the horizontal feed and to the punch stroke to avoid interference.

To obtain an accurate set-up of the longitudinal stroke, cams 85 and 86 are provided with the critical adjustment shown in Figs. 5 and 7. The cams each carry plates 87 attached thereto by suitable means 88, these plates being tapped at 89. A sleeve 90 on shaft 48 carries an eccentric 91 notched at 92 to receive a flange 93 of an adjusting screw 94 threaded at 95 into the tapped opening 89. A slight turn of this screw turns the eccentric 91, which is free on shaft 48, and consequently alters the relative position of the cams 85 and 86 to the ball-bearing rollers 72 and 73.

Each cam 85 and 86 has a slot 97 to just fit a tie rod 96 permitting only slight movement (Figs. 7 and 14) radially and no movement circumferentially. The ends of rod 96 engage cams 66 and 67 and rod 96 is driven thereby. The up-and-down cams 66 and 67 and the longitudinal film-moving cams 85 and 86 must therefore move exactly together and the shuttle movements are accurately timed thereby.

It should be noted that like the punch and pilot, the shuttle relies on reeds which vibrate or flex between the ends, one of which is rigidly attached to one part and the other end of which is rigidly attached to another part, thus avoiding the usual pivots or hinge pintles on which fitted parts may turn. Thus, there is but little possibility of these parts wearing so that play results. With modern loaded ball bearings, a very high degree of accuracy can be readily obtained.

I prefer to keep the film free from dust and dirt before punching particularly and for that reason have a vacuum chamber 98 attached to a vacuum line 99 to draw up dust or dirt from film F advancing to the punching station, as shown in Fig. 9.

Figure 16:
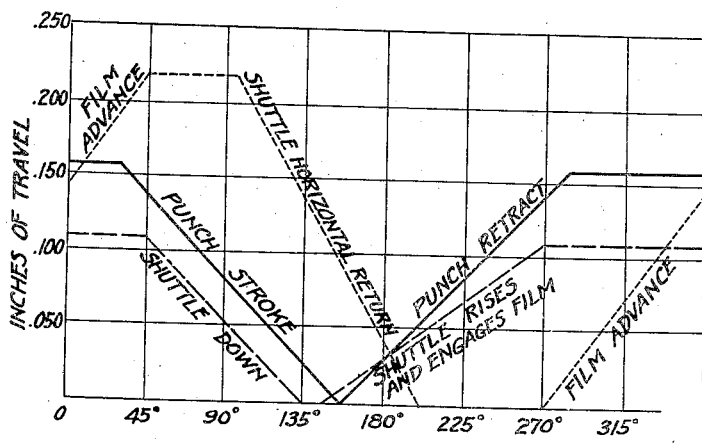
Fig. 16 is a cam-timing chart showing the relative movements of the film-advancing shuttle, the punch stroke and the shuttle stroke.

In Fig. 16 the chart shows the film advance, shuttle, and punch stroke relative movements. It will be noted that inches of cam throw are indicated vertically, while degrees of circular arc of cam rotation are shown on horizontal base line.

Film is advanced and while the film is still moving and about at 30°, the punch stroke starts. By the time the shuttle starts down and the film stops moving, 45°, the pilot engages an aperture moving the film .0005" (½ a thousandth of an inch) to complete the .300" between perforations and while held by the pilot descending, the punch perforates the film. Meanwhile, the shuttle is rising to a film-engaging position and engages the film at about 270° as the punch continues upwardly, releasing the punch and pilot from the film so that film may be again advanced at 270°. Thus, film remains stationary through 225° (except for the pilot movement) and is advanced through 135°, thus giving time for perforating.

All cams used herein are as gradual in curvature as possible as by avoiding abrupt contour changes, there is no difficulty in keeping the cam follower rollers on the cams even at the high speeds of 1800 to 2000 strokes per minute.

The punch 21 and pilot 22 are constant in acceleration with a long dwell at the elevated position (108°) and no dwell at the lowermost position.

With the mechanism above described, I have been able to perforate 16-mm. film at a speed of between 1800 to 2000 strokes per minute and with an accuracy of .300" between perforations plus or minus .00004". Normal types of 16 and 35-mm. film perforators work at approximately 550 to 710 strokes per minute. Moreover, this high speed can be maintained over long periods of time without noticeable wear of the parts, or any sacrifice in the accuracy of the perforations.

When run through a high-grade projector which is in perfect condition, film perforated to this extreme accuracy will produce no visible "jump," as .00004" at 120X enlargement is only .005" (five one-thousandths of an inch). This, of course, assumes that pictures are taken by an exceedingly accurate camera and projected by a projector also having parts made with extreme accuracy. The film is definitely capable of the accuracy indicated above when the film is of 16-mm. width. Similar increases of accuracy in film punching can, of course, be accomplished with other sizes and types of perforators, as, for instance, those used for 35-mm. and 70-mm. film.

While I have illustrated a 16-mm. perforator, because such perforators are difficult to make accurately, this is merely a preferred embodiment of my invention and other embodiments will readily suggest themselves to those skilled in the art.

I claim:

1. A motion picture film perforator comprising a base, a power-driven shaft, a film guideway, an arm articulated to the base and carrying a punch and pilot and movable through a fixed path carrying the punch to and from a die and carrying the pilot to and from a pilot aperture, a shuttle for moving the film between perforations including a first lever articulated to the base, and a second lever articulated to the first lever, cam followers on the arm, the first lever and the second lever, and cams carried by the power-driven shaft against which the cam followers are spring pressed for operating the shuttle and the punch and pilot in timed relation.

2. A motion picture film perforator, as defined in claim 1, characterized by all the articulated connections comprising a flexible metal plate rigidly connected to the articulated members to flex in one plane only.

3. A motion picture film perforator, as defined in claim 1, characterized by all the articulated connections comprising a flexible, long, and narrow plate rigidly connected to both of the articulated members along its length whereby said plate may bend freely in one direction and may be rigidly held against bending at right angles thereto.

4. A motion picture film perforator, as defined in claim 1, characterized by all the articulated connections comprising a flexible reed comprising a plate of spring metal of much greater length than width, the arm and the first and second levers all being rigid members and being rigidly attached to an edge of the flexible reed along its length on one side, and a rigid connection between the opposite side of the reed and the member it is articulated to, leaving a narrow band through the center of the reed to flex in one direction and holding the reed rigidly against flexing at right angles thereto whereby the articulated members may be flexed by the cams and cam followers.

5. A motion picture film perforator comprising a base, a power-driven shaft, a film guideway, an arm articulated to the base and carrying a punch and pilot and movable through a fixed path carrying the punch to and from a die and carrying the pilot to and from a pilot aperture, a shuttle for moving the film between perforations including a first lever articulated to the base, and a second lever articulated to the first lever, cam followers on the arm, the first lever and the second lever, and cams carried by the power-driven shaft against which the cam followers are spring pressed, the cam follower of the arm resting on a cam directly above the cam shaft, the cam follower of the first lever resting on a cam directly below the cam shaft and the cam follower of the second lever resting on a cam at substantially right angles to the other two, whereby the shuttle and the punch and pilot may all be operated in timed relation.

6. A motion picture film perforator, as defined in claim 5, characterized by the cam followers being spring pressed against the cams, and by the cam followers comprising ball-bearing rollers carried by the arm, the first and second levers.

7. A motion picture film perforator comprising a base, a film guideway on the base, a power driven shaft, a film punch including an arm supported on the base by a flexible reed, means for oscillating the arm from the power-driven shaft, a shuttle carried by the base for moving the film a distance just short of the distance between perforatoins, and a pilot carried by the punch for moving the film a final distance to complete the distance between perforations in advance of the punch perforating the film.

8. A motion picture film perforator comprising a base, a film guideway on the base, a power-driven shaft, a plurality of cams thereon, a punch mechanism including an arm movably attached to the base and spring pressed against a cam on the cam shaft, a shuttle including a lever movably attached to the base, a second lever movably attached to the first lever, both levers spring-pressed against cams on the cam shaft and a claw carried by the shuttle for intermittently advancing a film, the arm carrying a pilot and punch, the pilot locating a film and the punch perforating a film moved through the film guideway by the shuttle.

9. A film perforator, as defined in claim 8, characterized by the flexible connection between the arm and base comprising a flexible metal reed.

10. A film perforator, as defined in claim 8, characterized by the flexible connection between the arm and base, the lever and base and between the two levers all being reeds of flexible metal of considerably greater length than width.

11. A motion picture film perforator comprising a casing, a film guide for directing a film across the casing, a power-driven shaft having a plurality of cams thereon, an articulated arm carrying a pilot and punch, a die beneath the punch, a cam follower carried by the arm and spring pressed upon a cam to receive up-and-down motion therefrom, a shuttle including claws, and a pair of articulated levers, the first lever articulated to the casing, the second lever articulated to the first lever, each lever including a cam follower spring pressed against a cam on the cam shaft, one spring pressed against the bottom of the cam to receive in and out movement therefrom, and the other spring pressed at 90° therefrom to receive longitudinal movement therefrom, all of said articulated connections comprising a long narrow flexible metal plate constituting a reed, rigidly attached to the articulated members and flexible transversely but not at right angles thereto.

12. A motion picture film perforator comprising a casing, a film guide for directing a film across the casing, a power-driven shaft, six cams carried by the cam shaft, a punch including an arm movably mounted on the casing and including spaced rollers spring-held against two of said cams, a shuttle including two articulated levers, one movably mounted on the casing and the second movably mounted on the first, two rollers carried by each lever, each pair of rollers being spring pressed into contact with a pair of cams on the cam shaft and a claw carried by an articulated lever.

13. The film perforator defined in claim 12 characterized by the articulated levers, being connected to each other and to the casing by flexible metal strips rigidly attached to the casing and lever and to both levers.

14. The motion picture film perforator defined in claim 12 characterized by at least one cam on the cam shaft including an eccentric sleeve carried by the shaft on which the cam is mounted, means to vary the position of the cam on the eccentric mount, and means for driving the cam from the next adjacent cam carried by the cam shaft.

15. The motion picture film perforator defined in claim 12 characterized by the plurality of cams comprising three pairs of cams, at least one pair of which is carried on eccentric notched sleeves rotatably movable on the shaft, an adjustable flange carried by the cams and engaging the notches of the eccentric sleeves for moving the sleeves and cam relative to each other, at least one pair of cams being keyed to the shaft, a rod carried by the cams keyed to the shaft, radial slots carried by the eccentrically-mounted cams drivingly engaging the rods for driving the eccentrically-mounted cams whereby one pair of cams may be adjusted relative to the other pairs of cams.

16. A motion picture film perforator including a shuttle for moving film intermittently, said shuttle comprising a support, a shaft carrying cams driven by power and mounted on the support, a film guide for directing film through a path, a rigid lever attached to said support by a flexible reed, said reed being rigidly attached to both the lever and the support and having an intermediate area flexible in one plane only, a second lever connected to the first lever with a similar flexible reed, a claw carried by the second lever, a cam following roller carried by each lever spring pressed against a cam carried by the power-driven shaft, the levers and cam-following rollers being positioned at substantially right angles to each other whereby one may give an in-and-out movement of the claw relative to the film and the other may give a longitudinal movement along the film path.

17. A perforator for punching strip material at separated intervals, said perforator having a punch and pilot carried by an arm, a shuttle carried by another arm and arranged to move said material intermittently, oscillating means adapted to operate said arms whereby the latter are moved in suitably-timed relation to alternately punch and advance the strip material, and supports for said arms comprising thin, flexible, members arranged with their longer dimensions transverse to the directions of oscillations of said arms, whereby said plates may flex slightly substantially about the centers of their longer dimensions during said oscillations.

JOHN G. JONES.

REFERENCES CITED

The following references are of record in the file of this patent:

UNITED STATES PATENTS

| Number | Name | Date |
|---|---|---|
| 1,031,468 | Power | July 2, 1912 |
| 1,291,524 | Howell | Jan. 14, 1919 |
| 1,416,168 | Carlton | May 16, 1922 |
| 1,782,570 | Howell | Nov. 25, 1930 |
| 2,016,710 | Ferris | Oct. 8, 1935 |

FOREIGN PATENTS

| Number | Country | Date |
|---|---|---|
| 396,602 | France | Apr. 16, 1909 |